US012797660B2

(12) United States Patent
Watson et al.

(10) Patent No.: US 12,797,660 B2
(45) Date of Patent: *Nov. 17, 2026

(54) PROTECTION AND INSTALLATION DEVICE FOR FIRE PROTECTION SPRINKLERS

(71) Applicants: Minimax Viking Patent Management GmbH, Bad Oldesloe (DE); Viking Group, Inc., Caledonia, MI (US)

(72) Inventors: Jason Thomas Watson, Hastings, MI (US); Martin H. Workman, Delton, MI (US); James E. Golinveaux, Ada, MI (US)

(73) Assignees: Minimax Viking Patent Management GmbH, Bad Oldesloe (DE); Viking Group, Inc., Caledonia, MI (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/918,704

(22) Filed: Oct. 17, 2024

(65) Prior Publication Data

US 2025/0050151 A1 Feb. 13, 2025

Related U.S. Application Data

(63) Continuation of application No. 18/574,866, filed as application No. PCT/US2023/027337 on Jul. 11, 2023, now Pat. No. 12,157,022.

(60) Provisional application No. 63/389,550, filed on Jul. 15, 2022.

(51) Int. Cl.
*A62C 37/12* (2006.01)
*A62C 31/28* (2006.01)

(52) U.S. Cl.
CPC .............. *A62C 31/28* (2013.01); *A62C 37/12* (2013.01)

(58) Field of Classification Search
CPC ................................ A62C 31/28; A62C 37/12
See application file for complete search history.

(56) References Cited

U.S. PATENT DOCUMENTS 3,490,647 A * 1/1970 Portyrata .............. F04B 23/023 222/1
3,797,746 A 3/1974 Gray et al.
4,154,375 A * 5/1979 Bippus ................. H01H 3/0206 200/61.86
4,176,756 A 12/1979 Gellman
(Continued)

FOREIGN PATENT DOCUMENTS

GB 126753 5/2019

OTHER PUBLICATIONS

International Searching Authority, International Search Report and Written Opinion in International Appln. No. PCT/2023/027377, Dec. 8, 2023, 15 pp.

*Primary Examiner* — Joseph A Greenlund
(74) *Attorney, Agent, or Firm* — Perkins Coie LLP

(57) ABSTRACT

A device and method for protecting and installing a fire protection sprinkler. The protective and installation device has two discrete protective members coupled to one another about the sprinkler by a releasable locking arrangement defined by a connection between the two discrete protective members. At least one of the members includes a torque assist portion for applying torque to the fire protection sprinkler and each of the members includes a deflector protection portion.

23 Claims, 8 Drawing Sheets

(56) References Cited

U.S. PATENT DOCUMENTS

| | | | | |
|---|---|---|---|---|
| 5,014,884 | A * | 5/1991 | Wunsch | B05B 9/0861 239/332 |
| 5,632,339 | A | 5/1997 | Fenske et al. | |
| 5,893,418 | A | 4/1999 | Ponte | |
| 6,098,256 | A | 8/2000 | Poussard | |
| 6,487,942 | B1 | 12/2002 | Carter et al. | |
| 6,554,211 | B1 * | 4/2003 | Prueter | B05B 9/0861 239/351 |
| 6,557,783 | B1 * | 5/2003 | Foster | B05B 1/3468 239/514 |
| 6,669,111 | B2 | 12/2003 | Vinson et al. | |
| 7,055,614 | B1 | 6/2006 | Ide | |
| 7,185,567 | B2 | 3/2007 | Ide | |
| 7,273,189 | B2 | 9/2007 | Ide et al. | |
| 7,540,330 | B2 | 6/2009 | Orr et al. | |
| D611,570 | S | 3/2010 | Yang | |
| 7,757,967 | B1 | 7/2010 | Yang | |
| 7,837,132 | B2 * | 11/2010 | Mazooji | B05B 9/0861 239/263.1 |
| 7,891,716 | B2 | 2/2011 | Orr et al. | |
| 7,900,852 | B2 | 3/2011 | Feenstra | |
| 8,297,663 | B2 | 10/2012 | Spears | |
| 8,469,111 | B2 | 6/2013 | Orr et al. | |
| 8,662,191 | B2 | 3/2014 | Orr et al. | |
| 8,905,151 | B2 | 12/2014 | Silva, Jr. et al. | |
| 9,027,660 | B2 | 5/2015 | Oldham | |
| 9,320,929 | B2 | 4/2016 | Koiwa | |
| 9,463,343 | B2 | 10/2016 | Koiwa | |
| 9,630,039 | B2 | 4/2017 | Koiwa | |
| 10,376,724 | B2 | 8/2019 | Macomber | |
| 10,737,371 | B2 | 8/2020 | Watson et al. | |
| 10,744,527 | B2 | 8/2020 | Jackson | |
| 10,940,348 | B2 | 3/2021 | Oldham et al. | |
| 10,940,349 | B2 | 3/2021 | Schnell et al. | |
| 11,160,999 | B2 | 11/2021 | Koiwa | |
| 11,260,415 | B2 | 3/2022 | English | |
| 11,548,027 | B2 | 1/2023 | Pleyte et al. | |
| 11,872,425 | B2 | 1/2024 | Feenstra et al. | |
| 2005/0194467 | A1 * | 9/2005 | Wanbaugh | B05B 9/0861 239/351 |
| 2006/0076434 | A1 * | 4/2006 | Hornsby | B05B 9/0872 239/302 |
| 2007/0256844 | A1 | 11/2007 | Blasing et al. | |
| 2010/0089419 | A1 * | 4/2010 | Field | A45D 34/04 134/6 |
| 2012/0158193 | A1 * | 6/2012 | De Rosa | B05B 11/0038 700/283 |
| 2012/0160874 | A1 * | 6/2012 | De Rosa | F04B 17/03 239/332 |
| 2012/0267453 | A1 | 10/2012 | Devaney | |
| 2014/0061233 | A1 * | 3/2014 | Lang | B05B 11/0039 220/203.23 |
| 2016/0016188 | A1 * | 1/2016 | Spang | B05B 11/1023 53/410 |
| 2017/0028236 | A1 * | 2/2017 | Macomber | A62C 37/08 |
| 2017/0326393 | A1 * | 11/2017 | Oldham | A62C 35/68 |
| 2019/0175968 | A1 | 6/2019 | Pressnell | |
| 2020/0024759 | A1 * | 1/2020 | Booth | B01D 15/10 |
| 2022/0203395 | A1 | 6/2022 | Pleyte et al. | |
| 2023/0087195 | A1 | 3/2023 | Workman et al. | |
| 2023/0088036 | A1 | 3/2023 | Feenstra et al. | |
| 2023/0089748 | A1 | 3/2023 | Watson et al. | |
| 2023/0090915 | A1 | 3/2023 | Scheffers et al. | |
| 2023/0100701 | A1 | 3/2023 | Feenstra et al. | |
| 2023/0101096 | A1 | 3/2023 | Watson et al. | |
| 2023/0355434 | A1 * | 11/2023 | Zhang | A61F 9/0026 |
| 2024/0198151 | A1 | 6/2024 | Feenstra et al. | |
| 2024/0325804 | A1 | 10/2024 | Watson et al. | |
| 2025/0196170 | A1 * | 6/2025 | Yang | B05B 9/0861 |

* cited by examiner

PROTECTION AND INSTALLATION DEVICE FOR FIRE PROTECTION SPRINKLERS

PRIORITY DATA AND INCORPORATION BY REFERENCE

This application is a continuation of U.S. patent application Ser. No. 18/574,866, filed Dec. 28, 2023, now U.S. Pat. No. 12,157,022, granted Dec. 3, 2024, which is a 35 U.S.C. § 371 application of International Application No. PCT/US2023/027337, filed Jul. 11, 2023, which claims the benefit of U.S. Provisional Application No. 63/389,550, filed Jul. 15, 2022, each of which is incorporated by reference in its entirety.

TECHNICAL FIELD

The present invention relates generally to protection devices and installation tools for fire protection sprinklers and systems. In particular, the present invention relates to a protective cover and installation device for fire protection sprinklers that allows for manual installation of the fire protection sprinkler.

BACKGROUND ART

Fire protection sprinklers include a sprinkler frame body with an inlet connected to a pressurized supply of firefighting fluid, such as water, and some type of fluid deflector spaced from an outlet of the frame body to distribute firefighting fluid discharged from the outlet in a defined spray distribution pattern over an area to be protected. In some fire protection sprinklers, the release of fluid discharge from the sprinkler body is controlled. For example, automatic fire protection sprinklers include a fusible or thermally responsive trigger assembly which secures a seal over an internal central orifice formed proximate the outlet of the frame body. When the temperature surrounding the automatic sprinkler is elevated to a pre-selected value indicative of a fire, the trigger assembly operates, fractures or collapses to release the seal assembly and fluid flow is initiated through the sprinkler body and out the outlet to impact the fluid deflector. In other types of controlled sprinklers, the trigger and/or seal is operated or otherwise ejected by a mechanical, electrical or computer-controlled actuator.

The response and actuation of the sprinkler is based upon the thermally responsive trigger or actuator; and the spray pattern or distribution of the firefighting fluid is defined by the fluid deflector configuration. Accordingly, proper sprinkler performance is a function of these operative components. In order to maintain the expected performance of the sprinkler, there is a need to protect the automatic fire protection sprinkler from unintended impact and/or damage. Known fire protection sprinkler covers are shown and described in U.S. Pat. Nos. 6,669,111; 7,273,189; 7,540,330; 7,757,967; and 7,900,852. Generally, these known protective devices are axially disposed over the sprinkler to protect the fluid deflector and the thermally responsive trigger. Alternatively, the protective device is strapped, pivoted, or connected about the sprinkler frame between the frame body and the fluid deflection member to protect the thermally responsive trigger. These known protective sprinkler covers are made from plastic and are affixed about the sprinkler to protect the sprinkler during storage, transport, handling and/or during the installation process. Once the sprinkler is properly installed in a branch connector, the protective device can be removed to place the sprinkler into service.

Fire protection sprinklers are used, for example, in the protection of storage commodities and occupancies. Storage fire protection systems include a network of pipes connected to a firefighting fluid supply and installed above the storage commodity beneath the ceiling of the occupancy. The piping network includes one or more branch lines coupled to a cross-main which is connected to a fluid supply by a vertical piping riser to supply the branch line(s) with the firefighting fluid. Fire protection sprinklers are connected to the branch lines in an appropriate orientation and at an appropriate sprinkler-to-sprinkler spacing.

To connect the fire protection sprinklers to the branch lines, the branch lines are configured as linear pipe headers with branch connectors extending from the header for receipt and threaded connection of a fire protection sprinkler. Known connectors have one inlet end configured for welded connection to the pipe header and an opposite outlet end with a tapered threaded end for connection of a sprinkler. In order to form a fluid tight seal between the threadedly engaged connector and the sprinkler, a sealing tape or putty is applied to the sprinkler. In order to form a fluid tight seal between the cooperating tapered threads, the sprinkler must be properly torqued using a wrench.

There are also known branch connectors which eliminate either or both of the tapered thread connection or the need to apply a sealing tape or putty. For example, each of U.S. Pat. Nos. 8,297,663; 8,662,191; and 10,744,527 and U.S. Patent Publication No. 2019/0175968 show and describe connectors or adapters for connecting a fire protection sprinkler to a pipe header. Each of these known connectors use an internal straight thread at the outlet to connect the tapered thread of the fire protection sprinkler, which allows the sprinkler to be placed in a desired rotational orientation without the interference of the thread engagement. To form a fluid tight seal between the connector and the sprinkler, each of the connectors employ an internal annular seal member. The sprinkler is then threaded into the connector and sufficiently torqued to form the fluid tight connection.

In order to maintain protection of the sprinkler during the installation process it is preferred to keep a protective device on the sprinkler. This can create a problem for properly torquing the sprinkler to form a fluid tight seal. The presence of a known protective device on the sprinkler frame can interfere or prevent proper wrench engagement. Moreover, it is problematic trying to use the known protective device to directly torque the sprinkler because these known protective devices are not configured to sufficiently grasp the sprinkler frame and transfer a torque sufficient to form a fluid tight sealed connection. Accordingly, there is a need for sprinkler protective devices that can protect operative components of the sprinkler during storage, transport handling and installation; transfer a torque or rotational force to form a fluid tight sealed connection between a sprinkler and a branch connector; and be easily removable in order to place the sprinkler into service.

DISCLOSURE OF THE INVENTION

Preferred embodiments of a method of protecting and installing a fire protection sprinkler, and more preferably, an automatic fire protection sprinkler, are achieved by providing a protected fire protection sprinkler assembly. A preferred embodiment of the protected fire protection sprinkler assembly includes a fire protection sprinkler and a protective device. The protective device, preferably, includes two discrete protective members that are opposed and coupled to one another in a releasable locked arrangement that defines an internal void for housing and protecting at least a portion of a fire protection sprinkler. The protective members of the preferred protective device include a solid wall, and, in particular, an impervious wall, that confronts the fire protection sprinkler and provides a torque assist portion and a deflector protection portion.

A preferred embodiment for the protected fire protection sprinkler assembly includes a fire protection sprinkler including a body having an inlet, an outlet, an internal passageway extending between the inlet and the outlet along a central sprinkler axis, and an external thread formed about the central sprinkler axis. A pair of spaced apart frame arms are disposed in a plane and extending axially from the body and converge toward one another to form an apex along the central sprinkler axis and spaced axially from the outlet. A thermally responsive trigger is disposed along the central sprinkler axis between the outlet and the apex. The thermally responsive trigger is a component that responds and operates passively to an increase in temperature. The thermally responsive trigger can be included in an assembly to provide a thermally responsive trigger assembly. A fluid deflector is affixed to the apex. The fluid deflector, preferably, has an outer perimeter that surrounds the apex. The fluid deflector can be configured for various fire sprinkler protection position installations, such as, pendent, upright and/or horizontal, and can be also configured to control, suppress, and/or address a fire by distribution of a firefighting fluid, such as, water or a water-concentrate solution.

The preferred embodiment for the protected fire protection sprinkler assembly also includes a protective device disposed about the fire protection sprinkler. The preferred, protective device including a first protective member and a second protective member opposed from one another about the plane to at least partially surround the thermally responsive trigger. The first protective member and the second protective member defining a torque assist portion and a deflector protection portion. The torque assist portion, preferably, includes a plurality of torque assist surfaces contiguous the pair of spaced apart frame arms of the fire protection sprinkler.

The first protective member and the second protective member also include a releasable lock arrangement including a first and a second releasable lock arrangement; each releasable lock arrangement extending through the plane in which the pair of frame arms are disposed and proximate the apex of the fire protection sprinkler. The first releasable lock arrangement being disposed proximate a first lateral portion of the apex and the second releasable lock arrangement being disposed proximate a second lateral portion of the apex. The preferred protective device includes a releasing segment aligned with the first releasable lock arrangement and second releasable lock arrangement.

In a preferred embodiment, the protected fire protection sprinkler assembly includes a fire protection sprinkler and a protective device disposed about the fire protection sprinkler. The protective device includes a first protective member and second protective member opposed from one another about a plane to at least partially surround a thermally responsive trigger. Preferably, each of the first protective member and the second protective member includes an impervious wall. The impervious wall provides a shield for the fire protection sprinkler. The shields are secured together in an opposed manner by a releasable lock arrangement, which provides the only interconnection between the shields.

In a preferred embodiment, each impervious wall or shield, preferably, includes a first end located between a body, and, in particular, an outlet of the body, and an apex that supports a fluid deflector of the fire protection sprinkler and a second end that surrounds an outer perimeter of the fluid deflector of the fire protection sprinkler. The impervious wall also, preferably, includes at least a pair of lateral torque assist surfaces proximate the first end with each of the pair of lateral torque assist surfaces being contiguous with a pair of spaced apart frame arms of the fire protection sprinkler. The impervious wall also includes a pair of locking elements disposed about the apex, and a releasing segment proximate the second end and aligned with the pair of locking elements.

Preferably, the first end of the impervious wall comprises a shield segment. The shield segment comprises a concave segment and two convex segments laterally disposed about the concave segment. The concave segment confronts, and preferably is contiguous to the two convex segments and an inflection transition is between the concave segment and each of the convex segments. The pair of lateral torque assist surfaces comprise a first lateral torque assist surface contiguous a first of the two convex segments and a second lateral torque assist surface contiguous a second of the two convex segments. The first lateral torque assist surface comprises a first planar member extending parallel to the plane, and the second lateral torque assist surface comprises a second planar member extending parallel to the plane.

Preferably, alternatively, and/or additionally, the first end comprises a torque assist portion and a central section of the impervious wall comprises a central plurality of segments that narrow between the first end and the second end. Preferably, each of the plurality of central segments includes a curved portion disposed along the central sprinkler axis and a planar portion transverse to a central sprinkler axis of the fire protection sprinkler.

Preferably, alternatively, and/or additionally, the first end of the impervious wall includes a trigger shield segment for protecting the thermally responsive trigger assembly. The trigger shield segment has a first maximum radius from a central sprinkler axis of the fire protection sprinkler. The second end that surrounds the perimeter of the deflector includes a peripheral shielding surface for protecting the fluid deflector. The peripheral shielding surface has a second maximum radius from the central sprinkler axis, and the second maximum radius is greater than the first maximum radius.

Preferably, alternatively, and/or additionally, the second end that surrounds the perimeter of the deflector comprises a first radially extending shielding surface and a peripheral shielding surface that at least partially circumscribes the outer perimeter of the fluid deflector. The second end, preferably, includes a second radially extending shielding surface, and wherein the peripheral shielding surface extends between the first radially extending shielding surface and the second radially extending shielding surface.

Preferably, and/or additionally, a pair of lock elements comprise an insert and a receiver, and the releasing segment comprises a planar member extending parallel to the plane from one of a first longitudinal side of the impervious wall or a second longitudinal side of the impervious wall.

The preferred embodiments of the protected fire protection sprinkler assembly provide for a preferred method of installation, and, more preferably, a method for placing into service a fire protection sprinkler. The torque assist portion and deflector protection portion of the preferred embodiments of the protected fire protection sprinkler assembly allow for manually torquing the protected fire protection sprinkler assembly into a branch connector while providing damage protection to the fire protection sprinkler and/or harm or injury protection to the hand of a user that is manually torquing the protected fire protection sprinkler assembly. The protected fire protection sprinkler assembly is, preferably, manually torqued into the branch connector to compress a gasket in the branch connector and form a sealed connection between the protected fire protection sprinkler assembly and the branch connecter. Once the sealed connection is formed, the protective device of the protected fire protection sprinkler assembly is removed from the fire protection sprinkler. In particular, the protective device can be removed from the fire protection sprinkler by separating one of a pair of releasable lock arrangements that secures together the opposed shields of the preferred embodiment of the protected fire protection sprinkler assembly. Preferably, the separating at least one of the pair of releasable lock arrangements between the opposed shields is achieved by pulling a releasing segment aligned with the pair of releasable lock arrangements to place the fire protection sprinkler in a mode ready for servicing an area to be protected.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
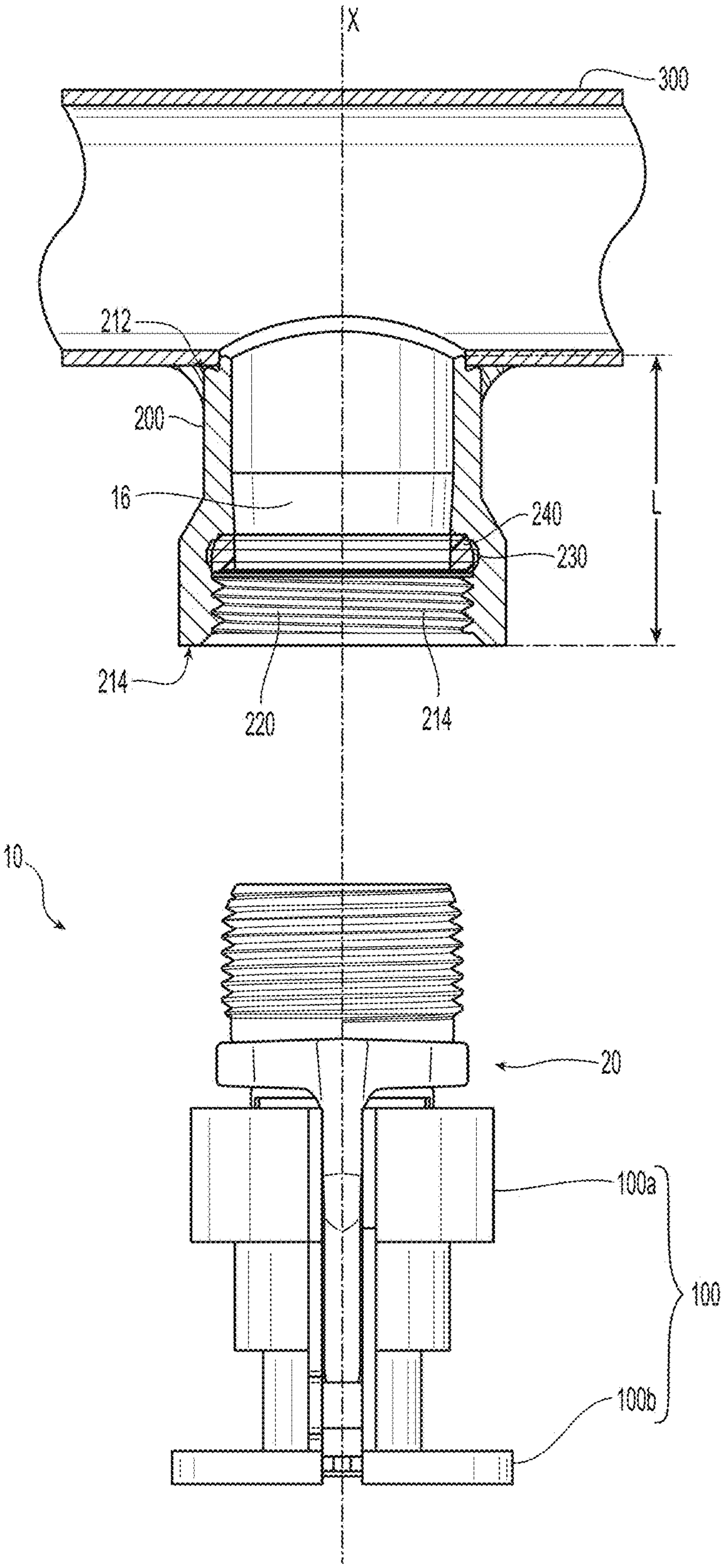
FIG. 1A is a partial cross-sectional exploded view of a preferred embodiment of a protected fire protection sprinkler assembly and an associated branch connector.
Figure 1B:
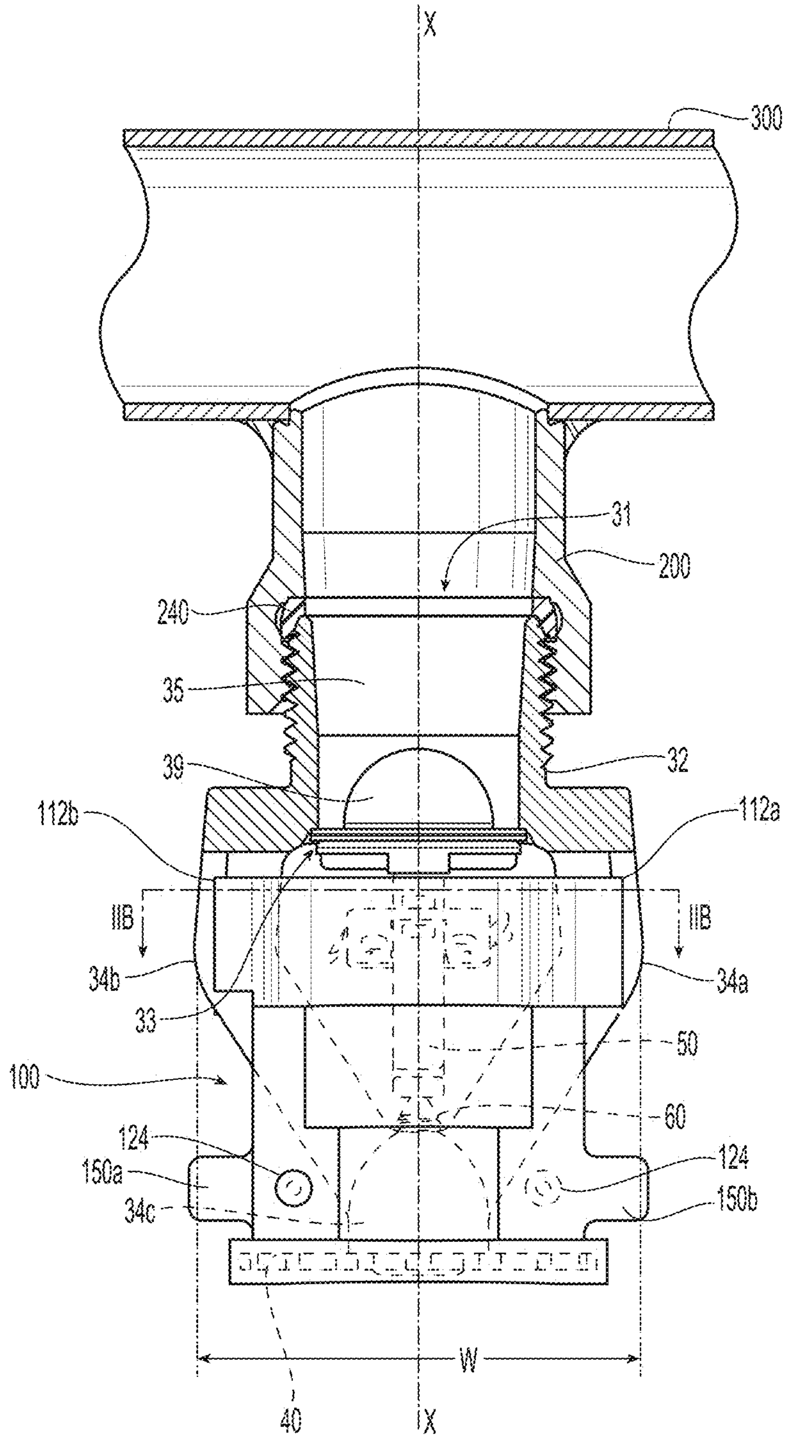
FIG. 1B is a partial cross-sectional phantom view of the protected fire protection sprinkler assembly coupled to the branch connector of FIG. 1A.
Figure 5:
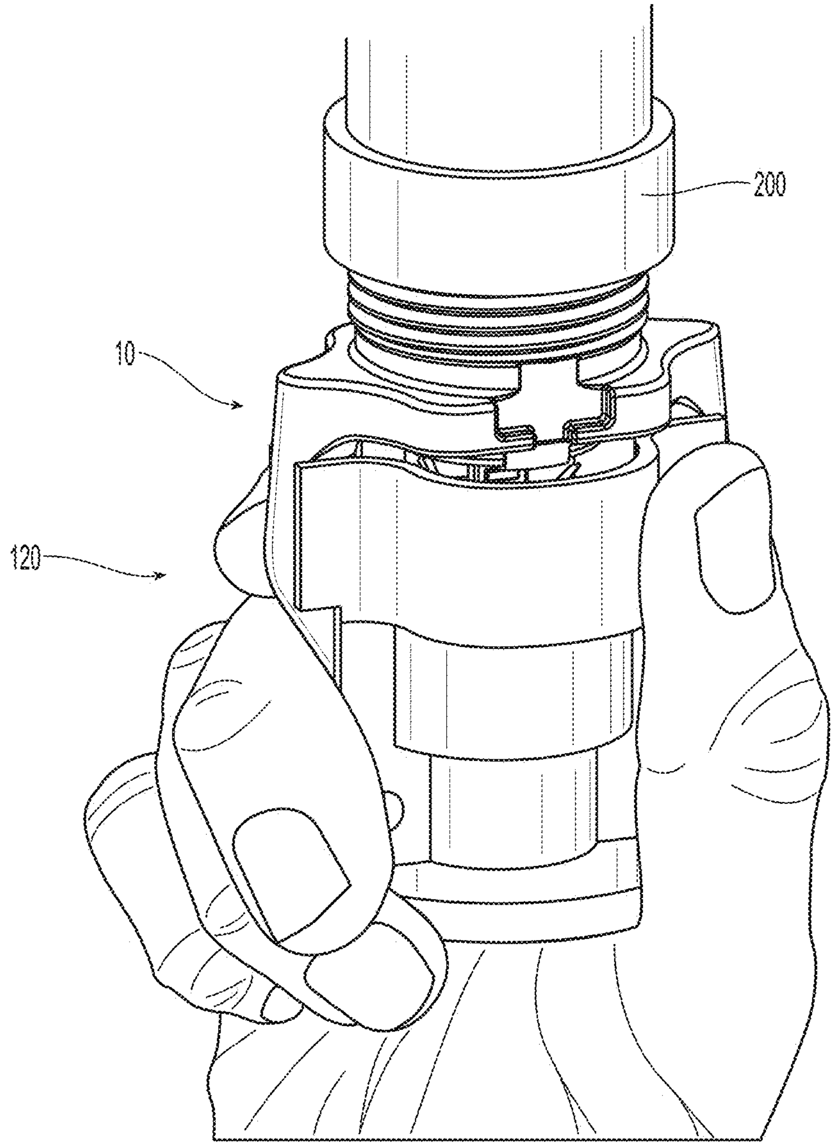
FIG. 5 is an illustration of the preferred protected sprinkler assembly in FIG. 1A being installed by hand.

Shown in FIG. 1A is an exploded partial cross-sectional view of a preferred protected fire protection sprinkler assembly 10 having a fire protection sprinkler 20 and a protective device 100 for installation in a branch connector 200 of a fluid supply pipe header 300. Preferred embodiments of the protective device 100 protect the sprinkler 20 from unintentional impact and damage during storage, transport, installation and/or when awaiting to be placed into service. Moreover, the protective device 100 also serves as a tool for installing the sprinkler 20 into the branch connector 200 of a fire protection sprinkler system. More specifically, the preferred device 100 facilitates installation of the sprinkler 20 by hand torquing the protected fire protection sprinkler assembly 10 into the branch connector 200 as illustrated in FIG. 5. Additionally, the preferred protective device 100 is configured for removal or release from the sprinkler 20, preferably by hand, in order to place the sprinkler 20 into service.

With reference to FIGS. 1A-1B, 2A-2B, and 4A-4B in preferred embodiments of the protected fire protection sprinkler assembly and its installation, the sprinkler 20 generally includes a frame 30 with a body 32 and a pair of spaced apart frame arms 34*a*, 34*b* extending from and preferably diametrically disposed about the body 32. The frame arms 34*a*, 34*b* are preferably aligned with one another in plane P. A fluid deflector 40 is coupled to the frame arms 34*a*, 34*b* and axially spaced from the body 32. The fluid deflector 40 and the sprinkler 20 can be configured for installation as a pendent sprinkler, as shown, an upright sprinkler, or a horizontal sprinkler. The sprinkler body 32 has a fluid inlet 31, a fluid outlet 33, defining an internal passageway 35 extending between the inlet 31 and the outlet 33 along a central sprinkler axis X-X. The sprinkler body 32 is configured for installation in the branch connector 200; and in preferred embodiments of the sprinkler 20, the body 32 includes an external thread formed about the central sprinkler axis X-X for a preferably threaded connection to the branch connector 200.

Figure 2A:
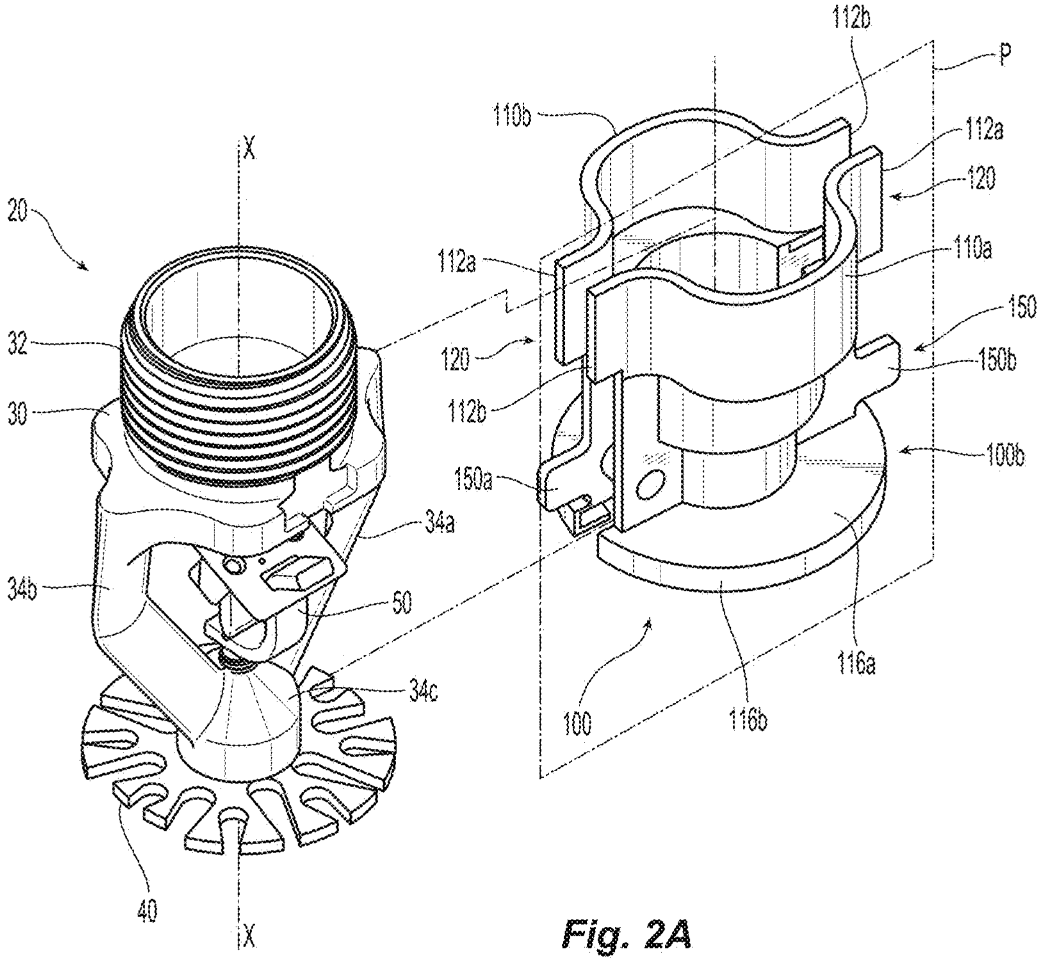
FIG. 2A is an exploded view of the preferred embodiment of the protected fire protection sprinkler assembly of FIG. 1A.
Figure 2B:
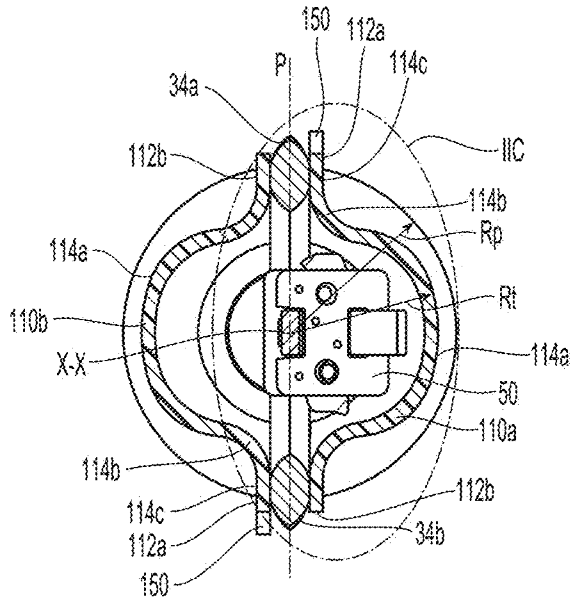
FIG. 2B is a cross-sectional plan view IIB in FIG. 2A of the protected fire protection sprinkler assembly of FIG. 1A.
Figure 4A:
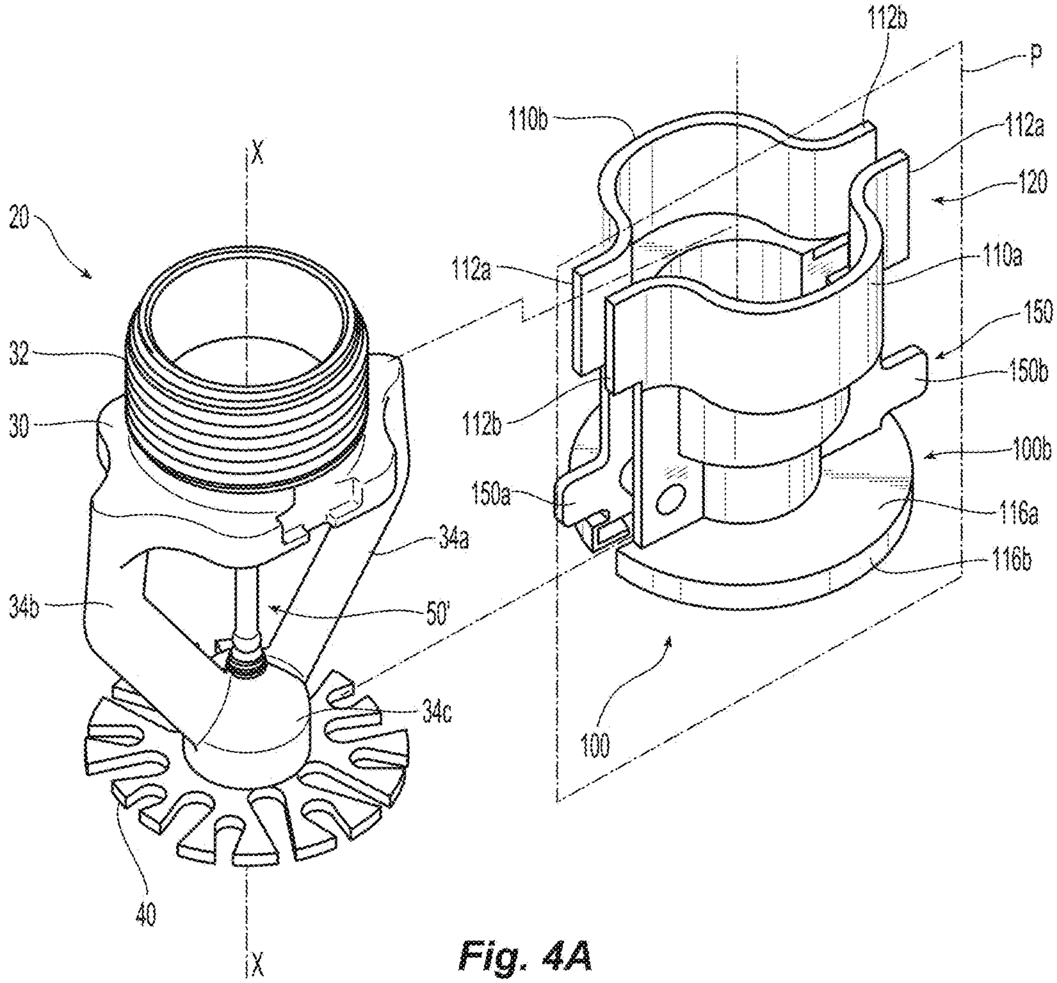
FIG. 4A is an exploded view of an alternate preferred embodiment of the protected fire protection sprinkler assembly of FIG. 1A.
Figure 4B:
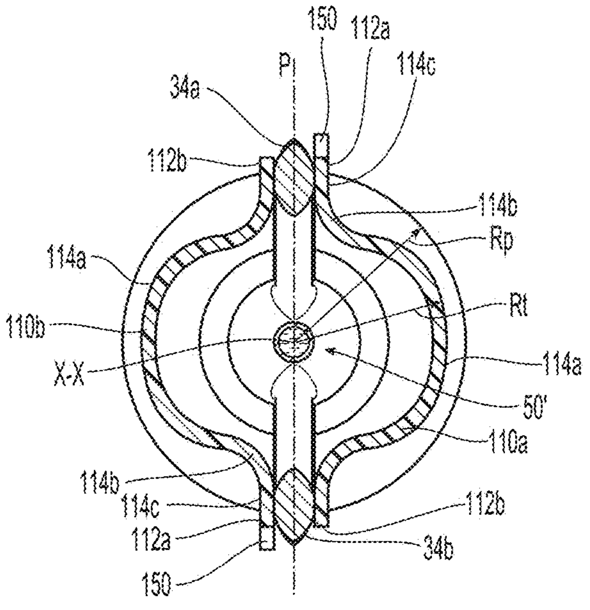
FIG. 4B is a cross-sectional plan view of the protected fire protection sprinkler assembly of FIG. 4A.

The sprinkler 20 is preferably an automatic sprinkler with a thermally responsive trigger, and, more preferably, a thermally responsive trigger assembly 50 coaxially disposed between the body 32 and the fluid deflector 40. A preferred embodiment of the trigger assembly 50 can be embodied as a solder link with strut and lever assembly as shown in FIG. 2A-2B. Alternatively, the trigger assembly can be a frangible glass bulb with supporting structure to provide an alternative embodiment of the thermally responsive trigger assembly 50' as shown in FIGS. 4A-4B. As such, the solder link or the frangible glass bulb provide a thermally responsive trigger for the automatic fire protection sprinkler 20 that operates passively in response to temperature. The automatic fire protection sprinkler includes an internal seal assembly 39 that is supported in place by the thermally responsive trigger assembly 50, 50' to maintain a fluid tight seal. In preferred embodiments of the sprinkler 20, the fluid deflector 40 is affixed to an apex 34*c* coaxially aligned the central axis X-X, and preferably, surrounds the apex 34*c*. Alternatively, or additionally, the trigger assembly 50, 50' and/or seal assembly 39 can incorporate an actuator for a controlled discharge. In the preferred frame 30, the frame arms 34*a*, 34*b* preferably converge to form the preferred apex 34*c*. The thermally responsive trigger assembly 50, 50' is preferably axially supported by a threaded load screw or member 60 threaded into the apex 34*c*. Accordingly, the apex 34*c* is preferably located between the thermally responsive trigger assembly 50, 50' and the fluid deflector 40. When the sprinkler 20 is installed and placed in service, the trigger assembly 50, 50' is configured to thermally actuate in response to a fire or sufficient level of heat. Upon thermal actuation, the seal assembly 39 is released and ejected from the outlet 33 preferably under fluid pressure delivered to the inlet 31 from the header 300 and through the branch connector 200. The firefighting fluid is discharged from the open outlet 33 for distribution by the fluid deflector 40 to address the fire event.

Generally, the preferred protection device 100 is a protection tool configured to install and connect the sprinkler 20 to the branch connector 200. Preferred embodiments of the protective device 100 also include a torque assist portion 120 or features thereof that facilitate transfer of a torque, and more preferably a hand torque, to the sprinkler 20 by minimizing or eliminating rotational slip or relative rotation between the sprinkler 20 and the device 100. As described herein, the torque assist portion 120 preferably includes an external surface of the device 100 that can be used by a user to apply a gripping and rotational force to the sprinkler 20. The device 100 can remain in place to protect the installed sprinkler 20 until the sprinkler and the sprinkler system are ready to be placed into service. In order to place the sprinkler 20 into service, the protective device 100 must be removed to expose the operational components of the sprinkler 20. Preferred embodiments of the device 100 includes a releasing segment 150 to remove the protective device 100 from the sprinkler 20.

In the preferred sprinkler assembly 10, the protective and installation device 100 is disposed about the fire protection sprinkler frame 30 so as to at least partially circumscribe and protect the thermally responsive trigger assembly 50, 50' and even more preferably partially circumscribe and protect the fluid deflector 40. As such, the protective device 100 includes a first portion 100*a* at a first end along the central sprinkler axis X-X that provides a torque assist portion and a second portion 100*b* at a second end along the central sprinkler axis X-X that provides a deflector protection portion. The device 100 is preferably disposed about the sprinkler 20 so as to locate and house operative components of the sprinkler 20 within the internal protective space or void of the device 100. With reference to FIGS. 2A and 4A, the protective device 100 preferably includes a first discrete member 110*a* and a second discrete member 110*b* in which they are shown opposed one another about a plane P in a preferred releasable locked arrangement with the pair of frame arms 34*a*, 34*b* preferably disposed in the plane P. Each of the preferably opposed members 110*a*, 110*b* is a wall structure, and, preferably, a solid wall, and, more preferably, an impervious wall that provides a first shield and an opposed second shield that are releasably locked to one another. As used herein, 'solid wall' means a wall structure with an outer perimeter between an interior surface that confronts the sprinkler 20 and an exterior surface exposed for gripping by a user, and the wall structure may have passages, such as, a through-hole, an aperture, and/or an opening so long as such passage does not affect the function of the torque assist portion and the deflector protection portion; in contrast, an "impervious wall" means a wall structure without a passage, such as, a through-hole, an aperture, and/or an opening.

Figure 3A:
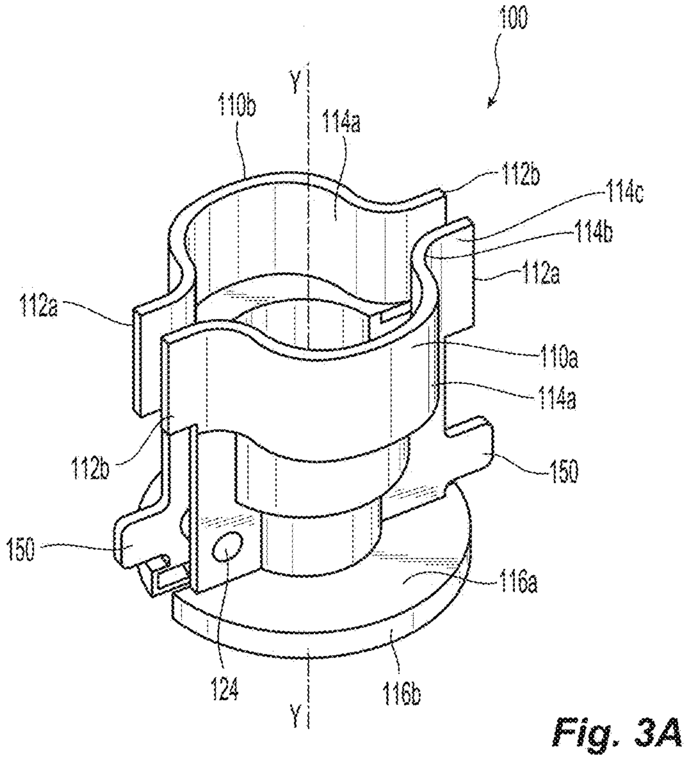
FIGS. 3A and 3B are perspective views of the protective device used in the protected fire protection sprinkler assembly in FIG. 1A.
Figure 3B:
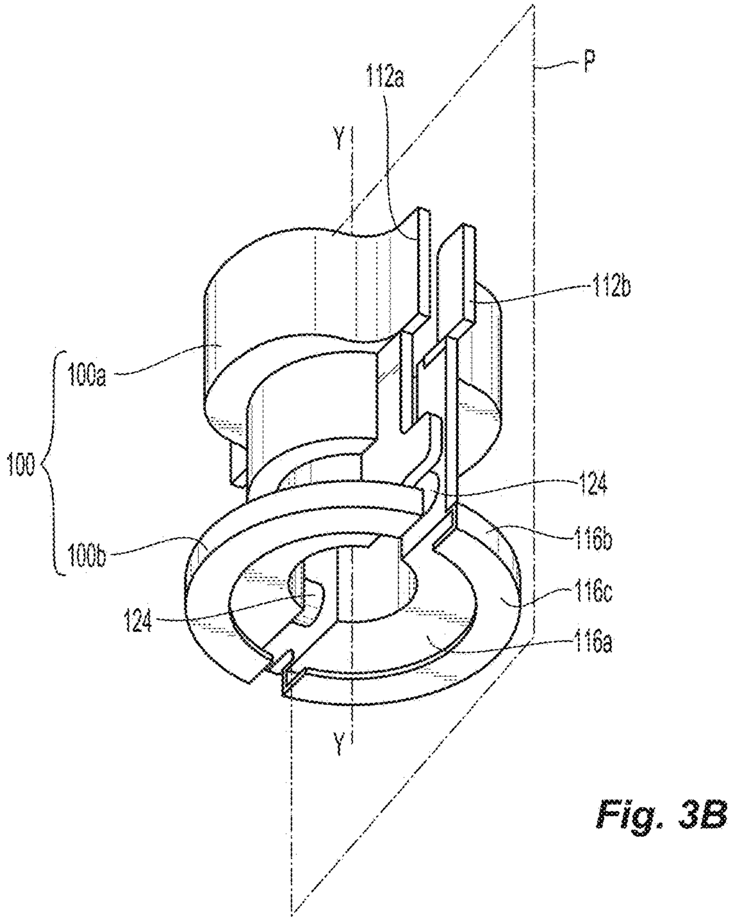

Each of the preferably opposed members 110*a*, 110*b* has a first lateral end 112*a* and a second lateral end 112*b* disposed laterally about the internal void of the device 100 or the sprinkler 20 housed therein. The opposed members 110*a*, 110*b* are preferably coupled to one another about the fire protection sprinkler 20. The members 110*a*, 110*b* are preferably identical to one another formed from a polymer or plastic material such as, for example, polyethylene and formed by molding such as, for example, injection molding. Alternatively, or additionally, the protective members 110*a*, 110*b* can be formed such that the assembled device 100 is symmetrical or asymmetrical about the plane P. Moreover, the protective members 110*a*, 110*b* can be formed so that the assembled device 100 is symmetrical or asymmetrical about another plane that is perpendicular to the plane P and intersecting the central device axis Y-Y as shown in FIGS. 3A-3B.

Figure 3C:
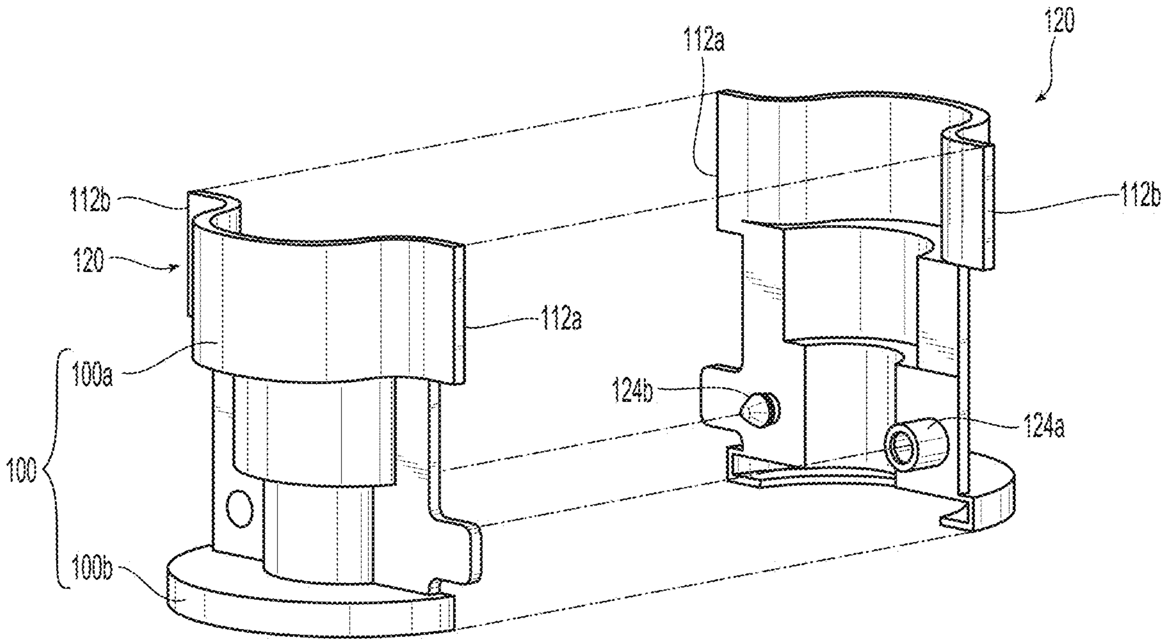
FIG. 3C is an exploded perspective view of the protective device in FIG. 3A.

To secure the device 100 about the sprinkler 20, the device 100 preferably includes a plurality of releasable lock arrangements 124 to secure the discrete members 110*a*, 110*b* of the device 100 about the sprinkler 20. Preferred embodiments of the releasable lock arrangements 124 are independent in that it is the only arrangement or component of the device that can secure the device 100 about the sprinkler 20 given the separate nature of the discrete protective member 110*a*, 110*b*. The releasable lock arrangements 124 are preferably defined by a connection between the two discrete protective members 110*a*, 110*b*. The releasable lock arrangements 124 define spacers for the two discrete protective members 110*a*, 110*b* and the interior surface of each protective member 110*a*, 110*b* includes one, and preferably more than one, component or element of the releasable lock arrangements 124. Moreover, one or both of the releasable lock arrangements 124 can form the preferred independent releasable lock arrangement as a latched connection. In preferred embodiments of the device 100 and releasable lock arrangements 124, with reference to FIG. 3C and the exploded view of the protective device 100, the first protective member 110*a* includes one locking element 124*a* and another locking element 124*b* and the second protective member 110*b*, which in a preferred embodiment is identical to the first protective member 110*a*, also includes locking elements 124*a*, 124*b*. In the preferred embodiment, coupling the identical and opposed first protective member 110*a* and the second protective member 110*b* to define the internal void for housing the sprinkler 20 or a portion thereof is achieved by the locking element 124*a* of the first protective member 110*a* engaging the locking element 124*b* of the second protective member 110*b* and the locking element 124*b* of the first protective member 110*a* engaging the locking element 124*a* of the second protective member 110*b* The releasable lock arrangements 124, preferably, include a cylindrical insert as the locking element 124*a* of one protective member 110*a*, 110*b* that engages a complementary cylindrical receiver as the locking element 124*b* of the other protective member 110*a*, 110*b* in a preferred frictional or interference fit such as, for example a snap-fit connection, to connect the discrete members 110*a*, 110*b* to one another in the preferred latched connection and assembled configuration of the device 100. In the assembly of the device 100, the discrete protective members are opposed to one another and drawn together, independent of one another, to bring the locking elements 124*a*, 124*b* into engagement. In the preferred embodiment, the releasable lock arrangements 124 provide a pair of spacers disposed laterally about the device axis; or in the assembly 10, the releasable lock arrangements 124 are radially disposed about each side of the apex 34*c* between the members 110*a*, 110*b* with each protective member 110*a*, 110*b* having one insert as the locking element 124*a* and one receiver as the locking element 124*b*. Additionally, one or both of the preferred members 110*a*, 110*b* can include other internal formations that extend toward and preferably perpendicular to the plane P to surround and/or contact the trigger assembly 50, 50'. The formations preferably stabilize the protective device 100 about the frame 30 and more preferably center the trigger 50, 50' within the device 100. The releasable lock arrangements 124 are preferably located radially inward with respect to the lateral ends 112*a*, 112*b* and in particular, located radially inward of the preferred releasing segment 150.

In the assembled configuration of the device 100, the releasable lock arrangements 124 extend perpendicularly to the plane P between the members 110*a*, 110*b* to space the members 110*a*, 110*b* apart from one another. In the preferred protected sprinkler assembly 10, the first and second members 110*a*, 110*b* are spaced apart from one another about the plane P and more particularly the opposed lateral ends 112*a*, 112*b* are spaced apart about the plane P for gripping the frame arms 34*a*, 34*b* therein as seen in FIGS. 2B and 4B. More particularly, in the preferred assembly 10, the first lateral end 112*a* of the first member 110*a* and the second lateral end 112*b* of the second member 110*b* are positioned opposite one another about the plane P with one frame arm 34*a* disposed therebetween with the second lateral end 112*b* of the first member 110*a* and the first lateral end 112*a* of the second member 110*b* are positioned opposite one another about the plane P with the other frame arm 34*b* disposed therebetween. In preferred embodiments of the protective device 100, the device can be grasped by hand of a user and the two members 110*a*, 110*b* can be drawn toward one another to grip the sprinkler 20. Illustrated in FIG. 5 is the protected sprinkler assembly 10 being installed into the branch connector by hand. The preferred protective device 100 peripherally protects operative components of the sprinkler 20 including the trigger and the fluid deflector. Accordingly, the device 100 can protect the hand of the user from the surface edges, and, in particular, an edge of the fluid deflector 40 of the sprinkler 20.

In preferred embodiments of the protective device 100, each of the lateral ends 112*a*, 112*b* of the respective first and second members 110*a*, 110*b* grips the respective frame arm 34*a*, 34*b*, and is also contiguous, that is, in contact with at least a portion of the respective frame arm 34*a*, 34*b* when the releasable lock arrangements 124 secure the first and second members 110*a*, 110*b* about the sprinkler 20. Alternatively, one or all of the lateral ends 112*a*, 112*b* of the respective first and second members 110*a*, 110*b* are spaced from the respective frame arm 34*a*, 34*b* when the releasable lock arrangements 124 secure the first and second members 110*a*, 110*b* about the sprinkler 20 and grip the respective frame arm 34*a*, 34*b* to become contiguous the respective frame arm 34*a*, 34*b* when the protective device 100 is grasped by the hand of a user as shown in FIG. 5.

Once installed, the protective device 100 can remain in place to protect the sprinkler until the system is ready to be placed into service. Once the sprinkler 20 and system are ready to be placed into service, the device 100 must be removed to expose the operational components of the sprinkler 20 for providing the desire fire sprinkler protection. To facilitate removal of the device 100 from the sprinkler 20 and in order to place the sprinkler into service, preferred embodiments of the device 100 include a releasing segment 150 to remove the device 100 from about the sprinkler 20. The releasing segment 150 is preferably configured to separate the protective members 110*a*, 110*b* from one another. In preferred embodiments, the releasing segment 150 is integrally formed as a segment of one or both of the discrete protective members 110*a*, 110*b* to define a lever with which a force can be applied to separate the protective members 110*a*, 110*b* from one another and release the device 100 from its position about the sprinkler 20. The releasing segment 150 is preferably formed as a laterally extending tab that is disposed laterally of the central axes X-X, Y-Y. The releasing segment 150 is preferably located along the lateral end 112*a* of one, and preferably both, of the protective members 110*a*, 110*b*. The preferred releasing segment 150 is shown as a tab that is a substantially planar member extending parallel to the plane P which can be grabbed by hand and pulled to release the one or both of the releasable lock arrangements 124 and separate the protective members 110*a*, 110*b* from one another. The preferred planar member of the releasing segment 150 has a plurality of linear sides and defines an inner surface 150*a* relative to the internal void of the device 100 and an outer surface 150*b* opposite the inner surface 150*a*. A releasing segment 150 can be alternatively shaped and/or located along the one or more protective members 110*a*, 110*b* provided that the releasing segment can be used to apply a force to disassemble the device 100. For example, the preferably planar tab member of the releasing segment 150 can be angled or skewed with respect to the plane P. Moreover, the tab member of the releasing segment 150 can be alternatively shaped or have surface treatment so as to form a non-planar member, for example, a curved tab member, that can be preferably gripped by hand for releasing the device 100 from about the sprinkler 20.

In the protected assembly 10, the preferred releasing tab provide by the releasing segment 150 is preferably laterally disposed so as to expose each surface 150*a*, 150*b* for grabbing, handling, pushing, and/or pulling by a user to apply a separating force. The tab of the releasing tab 150 can be disposed relative to other components of the device 100 to facilitate release of the device 100 from the sprinkler 20. In preferred embodiments of the assembly 10 and device 100, each of the releasable lock arrangements 124 and the releasing segment 150 are disposed laterally about the apex 34*c*. Moreover, the releasable lock arrangements 124 and releasing segment 150 are preferably aligned with one another in the lateral direction about the apex 34*c*. In the preferred embodiment shown, the releasable lock arrangements 124 and the releasing segment 150 are axially aligned proximate or closer to the apex 34*c* than the outlet 33 of the sprinkler. Additionally, the external torque assist portion 120 of the device 100 is located axially between the sprinkler outlet 33 and the apex 34*c*, preferably axially closer to the outlet 33 than to the apex 34*c*. Accordingly, the releasing segment 150 and the releasable lock arrangements 124 are axially spaced from the preferred torque assist portion 120. In preferred embodiments, the releasing segment 150 is axially located between the fluid deflector 40 and the torque assist portion 120 and more preferably axially aligned with the torque assist portion 120 along the first lateral end 112*a* of the same protective member 110*a*, 110*b*.

Each of the first and second members 110*a*, 110*b* define a geometric profile that facilitates sprinkler protection and handling of the assembly 10. In preferred embodiments described herein, the protective device 100 defines the first portion 100*a* for protecting the thermally responsive trigger 50, 50' and preferably the second portion 100*b* for protecting the fluid deflector 40. In preferred embodiments of the device 100, at least one, and preferably both, of the first and second members 110*a*, 110*b* defines the torque assist portion having a shielding segment and a convex segment, with respect to the internal void of the device, having a transition therebetween to define a preferred external torque assist surface of the device. The first and second members define a first width or space therebetween to form the first portion 100*a* of the device for protecting the thermally responsive trigger 50, 50'. The first and second members 110*a*, 110*b* also preferably define a second width therebetween that is greater than the first width to form the second portion 100*b* of the device 100 for protecting the fluid deflector 40. In at least one, and preferably both, of the protective members 110*a*, 110*b* includes a concave segment 114*a*, and a convex segment 114*b*, each defined with respect to the central sprinkler axis X-X, to provide the internal volume of the protective device 100 for the thermally responsive trigger assembly 50, 50' to be contained therein to define the shielding segment of the device 100 or portion thereof. The concave segment 114*a* is formed to partially circumscribe and shield the thermally responsive trigger assembly 50, 50'. In preferred embodiments, the concave segment 114*a* defines a variable radius about the central axis X-X.

The shielding portion of the members 110*a*, 110*b* can be defined by alternate geometries about the axis X-X provided the geometry can at least partially surround and shield the trigger assembly 50, 50'. In preferred embodiments of the protection members 110*a*, 110*b* shown, each of the protective members include a concave segment 114*a* with two convex segments 114*b* laterally disposed about the concave segment 114*a*. Preferably, the central concave segment 114*a* and lateral convex segments 114*a*, 114*b* are contiguous with one another to define a preferred inflection transition 115 of the protective member 110*a*, 110*b*. For the preferred protective device 100, the transition 115 provides an external surface of the torque assist portion 120 of the device at each lateral end 112*a*, 112*b* of the protective members 110*a*, 110*b* that can be used for applying a torque to the protected assembly 10 to facilitate installation of the sprinkler 20 into the branch connector 200 or other fitting. The convex segment 114*b* defines a preferred external finger rest or thumb drive against which a hand torque can be applied as illustrated in FIG. 5. Additionally, or alternatively, the external surface of the convex segment 114*b* can include other surface features to accommodate and define the preferred finger or thumb rest. In the preferred sprinkler assembly 10, the convex segment 114*b* is preferably laterally located between the thermally responsive trigger assembly 50, 50' and one frame arm to define the preferred external torque assist surface. Accordingly, the protective device 100 provides a preferred method for protecting and installing a fire protection assembly 10 that includes shielding the thermally responsive trigger with a concave segment 114*a* of a protective member 110*a*, 110*b* relative to the central sprinkler axis X-X; and torquing the sprinkler assembly 10 into a branch connector 200 with a convex segment 114*b* of the protective member 110*a*, 110*b* relative to the central sprinkler axis X-X and located between one frame arm 34 and the trigger assembly 50, 50'.

Figure 2C:
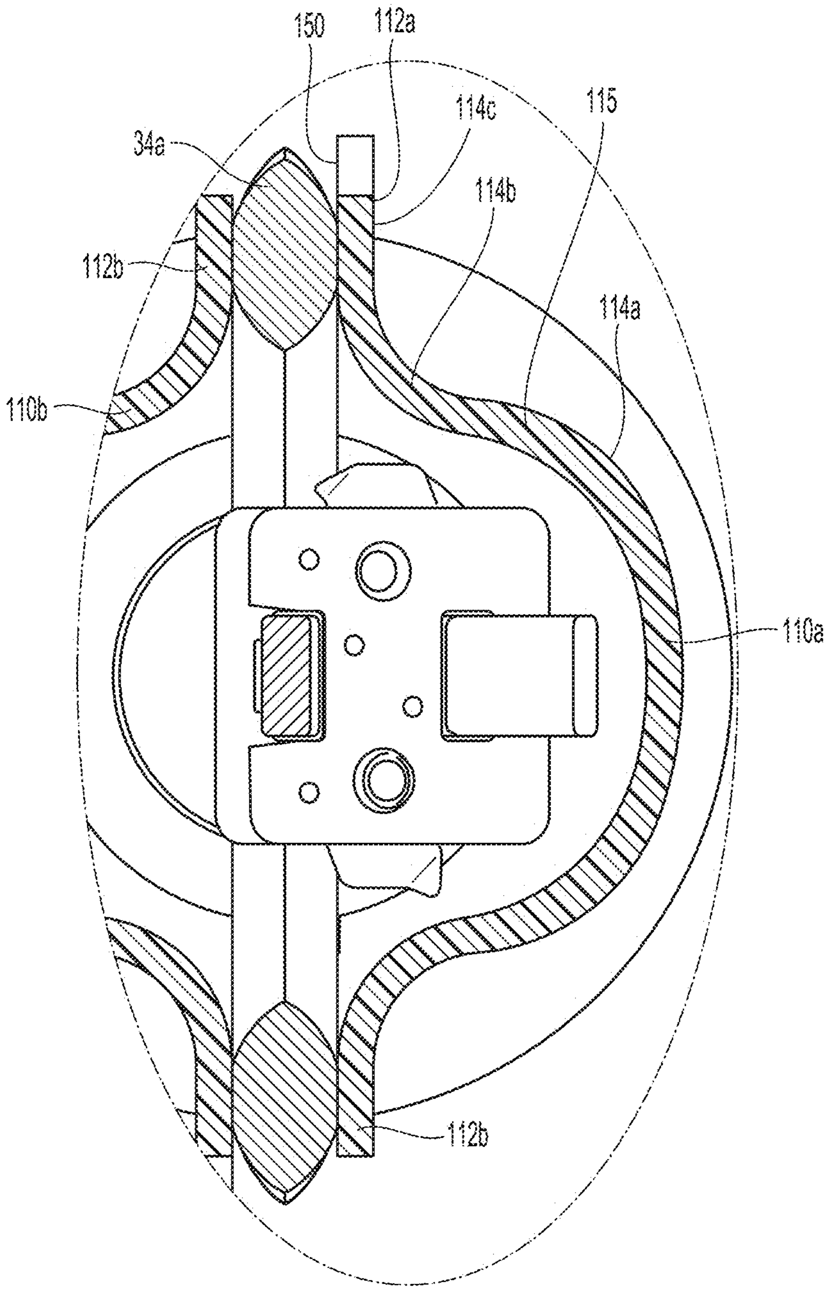
FIG. 2C is a detailed view of FIG. 2B within portion IIC.

To transfer a torque applied to the device 100 to the sprinkler 20, one and preferably both of the protective members 110*a*, 110*b* includes another segment 114*c* at one or both of the lateral ends 112*a*, 112*b* that confronts one of the frame arms 34*a*, 34*b*. In preferred embodiments of the device 100, one and preferably both of the protective members 110*a*, 110*b* includes a segment 114*c* at each lateral end 112*a*, 112*b* that confronts one of the frame arms 34*a*, 34*b*. More preferably, the segment 114*c*, preferably, extends parallel to the plane P to provide a planar segment of the torque assist portion 120, and, preferably, is configured contiguously with the concave and convex segments 114*a*, 114*b* so that the convex segment 114*b* is located between the concave segment 114*a* and the segment 114*c*. Accordingly, the segment 114*c* further defines the preferred external torque assist surface of the torque assist portion 120 with the convex segment 114*b* and the preferred inflection transition 115. With reference to FIGS. 2B and 2C, the preferred segment 114*c* of the torque assist portion 120 is located to confront, and, preferably, contact the frame arm 34*a* and preferred planar releasing segment 150 extends radially outside the confronted frame arm 34*a*. In an alternate embodiment in which the planar releasing segment 150 is skewed with respect to the plane P, the releasing segment 150 is skewed with respect to the planar portion 114*c* of the torque assist portion 120.

The protective device 100 is located axially to extend from the frame body 32 to the fluid deflector 40. Additionally, the protective device 100 is disposed about the frame 30 to expose the wrench boss of the sprinkler frame for use of the protective device 100 in combination with a wrench to install the sprinkler, if desired. The protective device extends axially to the fluid deflector 40 and more preferably at least peripherally surrounds the fluid deflector 40 and even more preferably house the fluid deflector 40. In preferred embodiments of the device 100, each of the first and second members 110*a*, 110*b* defines a first maximum radius of the first protective portion 100*a* from the central sprinkler axis for protecting the thermally responsive trigger 50, 50' assembly and a second maximum radius of the second protective portion 100*b* from the central sprinkler axis for protecting the fluid deflector 40 in which the second maximum radius is preferably greater than the first radius. As seen in FIGS. 3A and 3B, the concave segment 114*a* defines the preferred first maximum radius and the first protection portion 100*a* of the device 100 preferably narrows in the axial direction toward the second protection portion 100*b*. The first portion 100*a* can narrow uniformly or more preferably narrow in a step-wise fashion as shown. The step-wise fashion can be provided by a plurality of central segments with one or more of the central segments, preferably, having a curved portion disposed along the central sprinkler axis and a planar portion transverse to a central sprinkler axis of the fire protection sprinkler. Preferably, the central portions are surrounded by portions of the wall structure that are, preferably, planar to the plane, and aligned with the planar segment defined the segment 114*c* of the torque assist portion 120 and/or releasing segment 150. The plurality of central segments that narrow in the axial direction from the first protection portion 100*a* toward the second protection portion 100*b* aids in the user's ability to grip the protected fire protection sprinkler assembly 10. Additionally, the central segment proximate the second portion 100*b* allow for the positioning of the releasable lock arrangements 124 to be positioned about the apex 34*b*.

With reference to FIGS. 2A-2B, 3A-3C, and 4A-4B, the second protection portion 100*b* of the device that provides the deflector protection portion, preferably includes a radially extending shielding surface 116*a* disposed normal or perpendicular to the central longitudinal sprinkler axis X-X or device axis Y-Y to protect a surface of the fluid deflector 40 opposed to the outlet 33 and a peripheral shielding surface 116*b* that at least partially circumscribes the fluid deflector 40. Where the peripheral shielding surface 116*b* of the second portion 100*b* defines a radial distance Rp, and the preferred releasing segment 150 is preferably formed or has a portion thereof located at a radial distance that is preferably greater than the radial distance Rp. Additionally, the radial distance of radially extending shielding surface positions the peripheral shielding surface at a maximum radius of the radial distance Rp greater than a maximum radius of a radial distance Rt of the trigger shielding segment provided by convex segment 114*b* of the first protective portion 100*a* from the central sprinkler axis X-X. In the preferred embodiment shown in FIG. 3B, the second protection portion 100*b* can include a second radially extending shielding surface 116*c* parallel to the first radially extending surface and normal to the central axis X-X to form a preferred lower surface or lip for shielding the fluid deflector 40 with the peripheral shielding surface 116*b* extending between the radially extending shielding surfaces 116*a*, 116*c*.

Illustrated in FIG. 5 is the protected fire protection sprinkler assembly 10 being installed into the branch connector by hand. The preferred protective device 100 peripherally protects operative components of the sprinkler 20 including the trigger and the fluid deflector. The external surface of the torque assist portion 120 provides a finger rest and more preferably a thumb rest against which the installer can exert a force to torque the sprinkler 20 into the branch connector 200. With a thumb exerted against one device member 110*a*, the remaining fingers can curl about the other device member 110*b*. Once installed, the device 100 can be removed or released from the sprinkler 20 by pulling the preferred releasing segment(s) 150 to thereby expose operational components of the sprinkler 20 for service.

Referring again to FIGS. 1A and 1B, preferred embodiments of the protected sprinkler assembly are configured for hand installation into the branch connector 200 in a fluid tight connection. The branch connector 200 shown is generally a tubular member having a first inlet end 212 for connection to the pipe header 300 and a second outlet end 214 for a preferred threaded connection to the fluid distribution device 20. Depending upon the configuration of the fluid deflector 40 of the sprinkler 20, the branch connector 200 can be arranged on the header 300 for appropriate installation as pendent, an upright or a horizontal sprinkler. The branch connector 200 can be configured as a straight fitting or alternatively can be formed as a different type of fitting, such as for example, an elbow fitting or tee fitting to connect an appropriately configured sprinkler. Preferred embodiments of the branch connector 200 include an internal annular seal member for formation of a fluid tight sealed connection with the protected sprinkler assembly 20. The branch connector 200 includes a preferred internally formed gasket chamber 230 in which an annular seal member 240 is disposed. The annular seal member 240 is preferably configured as the seal shown in U.S. Pat. No. 10,744,527, which is hereby incorporated by reference in its entirety, to provide a preferred leak-proof connection between a fire protection sprinkler or other fire protection device and the branch connector 200. The material employed for seal member 240 is, preferably, an EPDM material having a durometer hardness of from 65 to 80, and preferably 70, to provide the desired sealing function and maintain sprinkler position. Firefighting fluid fed into the inlet end 212 flows through the annular seal member out the outlet end 214 to supply the sprinkler 20 for discharge and distribution in accordance with the performance specification of the sprinkler 20.

The connector 200 includes an internally threaded portion proximate the outlet end 214 for coupling preferred embodiments of the protected fire protection sprinkler assembly 10 and more preferably coupling the protected fire protection sprinkler assembly 10 by hand torque using preferred embodiments of the protective device 100 described herein. The outlet end 214 and internally threaded portion 220 is preferably configured for connection with the fire protection sprinkler 20 of a nominal size. Accordingly, preferred embodiments of the branch connector 200 at the outlet end 214 define a nominal size or diameter ranging from ½ inch to 1-½ inch and more particularly any one of: ½ inch, ¾ inch, 1 inch, 1-¼ inch or 1-½ inch. The outlet end 214 is preferably defined by a circular planar surface circumscribed and disposed orthogonally with respect to the central longitudinal axis X-X.

Generally, the external thread of the body 32 of fire protection sprinkler 20 of the protected fire protection sprinkler assembly 10 is of a tapered form, for example, NPT thread. The internal threaded portion 220 preferably includes internal straight threads for receipt of the tapered thread of the fire protection sprinkler 20. The threaded engagement remains fluid tight by compression and proper sealed engagement between the seal member 240, branch connector 200 and the sprinkler 20. The internal diameter ID of the internal straight thread can be defined by any one of the pitch diameter, minor diameter or major diameter of the internal threaded portion 220 provided the straight thread engages the tapered thread of the sprinkler 20. The internal straight thread can be for example, a 1-11.5 NPSH Thread; a ¾-14 NPSH Thread; or a ½-14 NPS Thread for mating with a correspondingly nominal 1 inch, ¾ inch or ½ inch fire protection sprinkler.

Use of the preferred straight internal thread permits preferred embodiments of the protected fire protection sprinkler assembly 10 to be rotatable about the axis X-X within the branch connector 200, preferably by hand, in any desired position while forming a proper fluid tight seal. More preferably, the internal thread portion 220 and the seal member 240 form a proper fluid tight seal engagement with the fire protection sprinkler 20 upon sufficient hand torque using preferred embodiments of the protective device 100. Threaded installation of the sprinkler 20 deforms the annular seal member 240 and provides a leak-proof fluid-tight seal between the sprinkler 20 and the branch connector 200. The connection between the branch connector 200 and the sprinkler 20 is sufficient to provide a fluid tight seal under a fluid pressure of up to 200 psi or more, for example, pressures of up to and including at least 175 psi.

The discharge or flow characteristics of the fire protection sprinkler 20, and, in particular, from the sprinkler body 32, is defined by the internal geometry of the sprinkler including its internal passageway, inlet and outlet (the orifice). Generally, the size of the sprinkler discharge orifice is defined by the nominal K-factor of a sprinkler. For a given sprinkler assembly, typically, the larger the K-factor, the larger the discharge orifice, and the smaller the K-factor, the smaller the discharge orifice. Nominal K-factors for sprinklers listed in the National Fire Protection Association Standard Publication, NFPA 13: Standard for the Installation of Sprinkler Systems, can range from 1 to 30 [GPM/(psi.)$^{1/2}$] and greater. NFPA 13 identifies the following nominal K-factors of 14 or greater: 14 [GPM/(psi.)$^{1/2}$] ("K14"); 16.8 [GPM/(psi.)$^{1/2}$] ("K16.8"); 19.6 [GPM/(psi.)$^{1/2}$] ("K19.6"); 22.4 [GPM/(psi.)$^{1/2}$] ("K22.4"); 25.2 [GPM/(psi.)$^{1/2}$] ("K25.2") and 28.0 [GPM/(psi.)$^{1/2}$] ("K28"). Even larger nominal K-factors are also possible. As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. Accordingly, the designed performance of a sprinkler is a function of the supply of a minimum fluid pressure or flow.

The length L of the branch connector 200 is preferably defined between the outlet end 214 and a mid-point of the concave portion of the saddle-shaped inlet end 212. The overall length L of the branch connector between the inlet end 212 and the outlet end 214, preferably, ranges from 1 inch to 1-½ inch, in order to ensure the identified discharge or flow characteristics of the fire protection sprinkler, and, in particular, the sprinkler body 32, is achieved when the fire protection sprinkler 20 is installed in the branch connector 200. Moreover, the overall length L of the branch connector 200 preferably corresponds or varies with the outlet nominal diameter size. For example, for a nominal outlet diameter of 1 inch, the length L is preferably 1-¼ inch, where the nominal outlet diameter is ¾ inch, the length L is preferably 1-⅛ inch and where the nominal outlet diameter is ½ inch, the length L is preferably 1-1/16 inch.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protected fire protection sprinkler assembly comprising:

a fire protection sprinkler including a body having an inlet, an outlet, an internal passageway extending between the inlet and the outlet along a central sprinkler axis, and an external thread formed about the central sprinkler axis, a pair of spaced apart frame arms disposed in a plane and extending axially from the body and converging toward one another to form an apex along the central sprinkler axis and spaced axially from the outlet, a thermally responsive trigger disposed along the central sprinkler axis between the outlet and the apex, and a fluid deflector affixed to the apex, the fluid deflector having an outer perimeter that surrounds the apex; and a protective device disposed about the fire protection sprinkler, the protective device including a first protective member and second protective member opposed from one another about the plane to at least partially surround the thermally responsive trigger, wherein the first protective member and the second protective member are identical and each comprises an impervious wall having:

a first end located between the outlet and the apex, a second end that surrounds the outer perimeter of the deflector, a pair of lateral torque assist surfaces contiguous with the pair of spaced apart frame arms, a pair of locking elements disposed between the first end and the second end, and a releasing segment proximate the second end and aligned with the pair of locking elements.

2. The assembly of claim 1, wherein the first end of the impervious wall comprises a shield segment.

3. The assembly of claim 2, wherein the shielding segment comprises a concave segment and two convex segments laterally disposed about the concave segment.

4. The assembly of claim 3, wherein the concave segment is contiguous the two convex segments and an inflection transition is between the concave segment and each of the convex segments.

5. The assembly of claim 4, wherein the pair of lateral torque assist surfaces comprise a first lateral torque assist surface contiguous a first of the two convex segments and a second lateral torque assist surface contiguous a second of the two convex segments.

6. The assembly of claim 5, wherein the first lateral torque assist surface comprises first planar member extending parallel to the plane, and the second lateral torque assist surface comprises second planar member extending parallel to the plane.

7. The assembly of claim 1, wherein the second end that surrounds the perimeter of the deflector comprises a first radially extending shielding surface and a peripheral shielding surface that at least partially circumscribes the outer perimeter of the fluid deflector.

8. The assembly of claim 7, further comprising a second radially extending shielding surface, and wherein the peripheral shielding surface extends between the first radially extending shielding surface and the second radially extending shielding surface.

9. The assembly of claim 7, wherein the first end comprises a torque assist portion.

10. The assembly of claim 9, wherein a central section of the impervious wall comprises a plurality of central segments that narrow between the first end and the second end.

11. The assembly of claim 10, wherein each of the plurality of central segments includes a curved portion disposed along the central sprinkler axis and a planar portion transverse to the central sprinkler axis.

12. The assembly of claim 1, wherein the first end of the impervious wall comprises a trigger shield segment for protecting the thermally responsive trigger assembly, the trigger shield segment having a first maximum radius from the central sprinkler axis, wherein the second end that surrounds the outer perimeter of the deflector comprises a peripheral shielding surface for protecting the fluid deflector, the peripheral shielding surface having a second maximum radius from the central sprinkler axis, and wherein the second maximum radius is greater than the first maximum radius.

13. The assembly of claim 1, wherein each of the pair of lock elements comprise an insert and a receiver.

14. The assembly of claim 13, wherein the insert and the receiver comprise a cylindrical insert and a cylindrical receiver.

15. The assembly of claim 13, wherein the insert and the receiver are disposed on an inner surface of the impervious wall about a central segment that is adjacent the second end.

16. The assembly of claim 15, wherein the insert is disposed laterally between the central segment and the releasing segment.

17. The assembly of claim 1, wherein the releasing segment comprises a planar member extending parallel to the plane from one of a first longitudinal side of the impervious wall or a second longitudinal side of the impervious wall.

18. The assembly of claim 1, wherein the first end of the impervious wall comprises a torque assist portion, wherein the torque assist portion includes the pair of lateral torque assist surfaces.

19. The assembly of claim 18, wherein the torque assist portion further comprises a concave segment contiguous two convex segments and an inflection transition is between the concave segment and each of the convex segments.

20. The assembly of claim 18, wherein the pair of lateral torque assist surfaces comprises a first planar member extending parallel to the plane and a second planar member extending parallel to the plane.

21. The assembly of claim 1, wherein the pair of lateral torque assist surfaces comprise a first lateral torque assist surface disposed on a first longitudinal side of the impervious wall and a second lateral torque assist surface disposed on a second longitudinal side of the impervious wall, wherein the first lateral torque assist surface comprises a first planar member extending parallel to the plane and the second lateral torque assist surface comprises a second planar member extending parallel to the plane.

22. A protected fire protection sprinkler assembly comprising:

a fire protection sprinkler including a body having an inlet, an outlet, an internal passageway extending between the inlet and the outlet along a central sprinkler axis, and an external thread formed about the central sprinkler axis, a pair of spaced apart frame arms disposed in a plane and extending axially from the body and converging toward one another to form an apex along the central sprinkler axis and spaced axially from the outlet, a thermally responsive trigger disposed along the central sprinkler axis between the outlet and the apex, and a fluid deflector affixed to the apex, the fluid deflector having an outer perimeter that surrounds the apex; and a protective device disposed about the fire protection sprinkler, the protective device including a first protective member and a second protective member which are identical and opposed from one another about the plane to at least partially surround the thermally responsive trigger, the first protective member and the second protective member defining a torque assist portion, a deflector protection portion, a first releasable lock arrangement through the plane and at a first lateral side of the fire protection sprinkler, second releasable lock arrangement through the plane and at a second lateral side of the fire protection sprinkler, and a releasing segment aligned with the first releasable lock arrangement and second releasable lock arrangement.

23. The assembly of claim 22, wherein the torque assist portion comprises a plurality of torque assist surfaces contiguous the pair of spaced apart frame arms.

* * * * *